(12) United States Patent
Miller et al.

(10) Patent No.: US 9,976,077 B2
(45) Date of Patent: May 22, 2018

(54) PHOTOCHROMIC ARTICLES CONTAINING POLYOXOMETALATE DERIVATIVES AND METHODS OF MAKING SAME

(71) Applicant: 3M INNOVATIVE PROPERTIES COMPANY, St. Paul, MN (US)

(72) Inventors: Adam D. Miller, St. Paul, MN (US); Matthew H. Frey, Cottage Grove, MN (US); Daniel E. Isaacson, Maplewood, MN (US); Jonathan E. Janoski, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days. days.

(21) Appl. No.: 15/320,495

(22) PCT Filed: Jun. 22, 2015

(86) PCT No.: PCT/US2015/036916
§ 371 (c)(1),
(2) Date: Dec. 20, 2016

(87) PCT Pub. No.: WO2016/003683
PCT Pub. Date: Jan. 7, 2016

(65) Prior Publication Data
US 2017/0198215 A1 Jul. 13, 2017

Related U.S. Application Data

(60) Provisional application No. 62/018,888, filed on Jun. 30, 2014.

(51) Int. Cl.
*C09K 9/00* (2006.01)
*C09K 9/02* (2006.01)
*C09D 5/29* (2006.01)
*C09D 11/50* (2014.01)
*C08L 33/12* (2006.01)
*C08J 5/18* (2006.01)

(52) U.S. Cl.
CPC .......... *C09K 9/02* (2013.01); *C08J 5/18* (2013.01); *C08L 33/12* (2013.01); *C09D 5/29* (2013.01); *C09D 11/50* (2013.01); *C08J 2333/12* (2013.01); *C08J 2485/00* (2013.01); *C08L 2203/16* (2013.01); *C09K 2211/183* (2013.01)

(58) Field of Classification Search
CPC ...... C09K 9/00; C09K 9/02; C09K 2211/183; C09D 5/29; C09D 11/50; C08L 33/12; C08L 2203/16; C08J 5/18; C08J 2333/12; C08J 2485/00
See application file for complete search history.

(56) References Cited

U.S. PATENT DOCUMENTS

| 2,895,892 | A | 7/1959 | Chalkley |
| 5,240,860 | A | 8/1993 | Hoenes |
| 5,286,885 | A | 2/1994 | Goetz |
| 5,391,638 | A | 2/1995 | Katsoulis |
| 5,471,337 | A | 11/1995 | Babinec |
| 8,206,874 | B2 | 6/2012 | Hamrock |
| 2003/0027052 | A1 | 2/2003 | Huang |
| 2008/0257204 | A1 | 10/2008 | Oriakhi |
| 2008/0299433 | A1 | 12/2008 | Stanis |

FOREIGN PATENT DOCUMENTS

| EP | 0659807 | 6/1995 |
| EP | 0723970 | 7/1996 |
| WO | WO 2016-003685 | 1/2016 |

OTHER PUBLICATIONS

Haolong Li, Wei Qi, Hang Sun, Pan Li, Yang Yang, Lixin Wu, A novel polymerizable pigment based on surfactant-encapsulated polyoxometalates and their application in polymer coloration, Dyes and Pigments 79 (2008) 105-110.*
Patrick Judeinstein, Claude Deprunb and Louis Nadjo, Synthesis and Multispectroscopic Characterization of Organically Modified Polyoxometalates, J. Chem. Soc. Dalton Trans. 1991, 1991-1997.*
Akoi, "Polyoxometalate (POM)-based, multi-functional, inorganic-organic, hybrid compounds: syntheses and molecular structures of silanol- and/or siloxane bond-containing species grafted on mono- and tri-lacunary Keggin POMs", Dalton Transactions, 2011, vol. 40, pp. 1243-1253.
Bao, "A Novel Structure and Photochromism of heteropolyoxometalates dispersed in polymer networks", Journal of Solid State Chemistry, Jul. 2012, vol. 191, pp. 158-161. XP028430365.
Bi, "Synthesis, properties and crystal structure of some polyoxometallates containing the tris (hydroxymethyl) aminomethane cation", Inorg. Chim. Acta., 2000, vol. 305, pp. 163-171.
Chen, "Preparation and photochromism of nanocomposite thin film based on polyoxometalate and polyethyleneglycol", Dec. 2007, vol. 61, No. 30, pp. 5247-5249. XP022315194.
Feng, "Novel hybrid inorganic-organic film based on the tungstophosphate acid—polyacrylamide system: Photochromic behavior and mechanism", J. Mater. Res., Jan. 2002, vol. 17, No. 1, pp. 133-136.
Ginsberg, "α-, β-, and γ-Dodecatungstosilicic Acids: Isomers and Related Lacunary Compounds", Inorganic Syntheses, 1990, vol. 27, pp. 85-96.

(Continued)

*Primary Examiner* — Bijan Ahvazi
(74) *Attorney, Agent, or Firm* — Adrian L. Pishko

(57) ABSTRACT

A photochromic article is provided, containing a polymer and a polyoxometalate derivative anion and counter cation complex distributed in the polymer. A method of forming a photochromic film is also provided, including forming a composition containing a polymer or a precursor of the polymer and a polyoxometalate derivative and counter cation complex and preparing a film from the composition, the film containing the polyoxometalate derivative and counter cation complex distributed in the polymer. Further, a precursor composition is provided, including a polymer or a precursor of the polymer and a polyoxometalate derivative anion and a counter cation.

11 Claims, No Drawings

(56) References Cited

OTHER PUBLICATIONS

Gouzerh, "Main-group Element, organic, and organometallic Derivatives of polyoxometalates", Chemical Reviews, 1998, vol. 98, No. 1, pp. 77-111. XP055216308.

Judeinstein, "Synthesis and Multispectroscopic Characterization of Organically Modified Polyoxometalates", J. Chem. Soc. Dalton Trans., Jan. 1, 1991, pp. 1991-1997. XP002027205.

Judeinstein, "Synthesis and Properties of Polyoxometalates Based Inorganic-Organic Polymers" Chem. Mater. 1992, vol. 4, No. 1, pp. 4-7.

Knoth, "Derivatives of heteropolyanions. 1. Organic derivatives of W12SiO404-, W12PO403-, and MO12SiO404", Journal of the American Chemical Society, Jan. 31, 1979, vol. 101, No. 3, pp. 759-760.

Li, "A novel polymerizable pigment based on surfactant-encapsulated polyoxometalates and their application in polymer coloration", Dyes and Pigments, Nov. 1, 2008, vol. 79, No. 2, pp. 105-110. XP022640120.

Oliveira Jr., "Local Structure and Photochromic Response in Ormosils Containing Dodecatungstophosphoric Acid", Chemistry of Materials, 2011, vol. 23, No. 4, pp. 953-963.

Qi, "Polyoxometalate/polymer hybrid materials; fabrication and properties", Polymer International, 2009, vol. 58, No. 11, pp. 1217-1225. XP055214326.

Yang, "A novel photochromic PVA fiber aggregates contained $H_4SiW_{12}O_{40}$", Mater. Lett. 2005, vol. 59, pp. 450-455.

Zhang, "Construction of Self-Assembled Ultrathin Polyoxmetalate/ 1, 10-Decanediamine Photochromic Films", J. Phys. Chem. B, 2004, vol. 108, pp. 6944-6948.

Zhong, "Polyoxometalate cured epoxy resins with photochromic properties", Colloid and Polymer Science, Nov. 2012, vol. 290, No. 16, pp. 1683-1693. XP035125300.

International Search Report for PCT International Application No. PCT/US2015/036916 dated Oct. 8, 2015, 4 pages.

\* cited by examiner

PHOTOCHROMIC ARTICLES CONTAINING POLYOXOMETALATE DERIVATIVES AND METHODS OF MAKING SAME

CROSS REFERENCE TO RELATED APPLICATIONS

This application is a national stage filing under 35 U.S.C. 371 of PCT/US2015/036916, filed Jun. 22, 2015, which claims the benefit of U.S. Application No. 62/018,888, filed Jun. 30, 2014, the disclosure of which is incorporated by reference in its/their entirety herein.

TECHNICAL FIELD

The present disclosure relates to articles including a photochromic polyoxometalate derivative and counter cation complex, such as films, coatings, glazings, adhesives, inks, optical elements (e.g., ophthalmic lenses) or pellets, precursor compositions, including fluid precursor compositions, for making the articles, such as liquid solutions, fluid dispersions, or powders, and methods of making the articles.

BACKGROUND

There is a need in the art for improved photochromic articles such as coatings, films, and optical elements. Most successful commercial applications of photochromic articles are related to ophthalmic lenses that darken in the sun and return to their initial transparency in typical indoor light. Some niche markets include the security ink and the entertainment/toy markets. There are technical challenges that prevent this technology from entering the vehicles, windows, and structural glass markets, including durability, fatigue, and switching time. The organic dyes that have been used in a majority of the photochromic systems are degraded by light and oxygen and thus their lifetimes suffer. Typical known materials do not compare well with the traits desired, for instance, in a photochromic system designed for window applications.

SUMMARY

The present disclosure provides articles and methods for making articles containing a photochromic polyoxometalate derivative and counter cation complex.

In a first embodiment, the present disclosure provides a photochromic article including a polymer and a polyoxometalate derivative and counter cation complex comprising a polyoxometalate anion and a counter cation distributed in the polymer, wherein the polyoxometalate is a derivative of a polyoxometalate. The polyoxometalate derivative anion is of the general formula (I):

$$[XM_{11}O_{39}(X'L_y)]^{z-} \quad (I)$$

wherein: X is a heteroatom selected from Si, B, P, Ge, or As;
z is from 3 to 6;
M is W, Ta, Nb, or Mo;
X' is a heteroatom or group containing a heteroatom, selected from Si—O—Si, P, Ge, Ti, Sn, or As;
y is from 1 to 2, wherein when X' is Si—O—Si y is 2 and one L is bound to each Si atom;
L is of formula (II), an alkylguanidine group, an alicyclic group, an aliphatic group, or an aryl group;

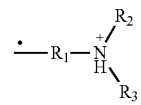

wherein:
$R_1$ is an alkylene group and $R_2$ and $R_3$ are independently selected from H, an alkyl group, an alkenyl group, an alkylamine group, an amide group, an imine group, a heterocyclic group, an aryl group, or an alicyclic group; and
the counter cation is one or more of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

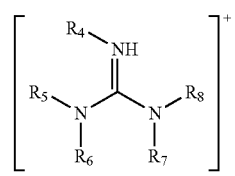

wherein:
$R_4$ through $R_8$ are independently selected from H, an alkyl group, an alicyclic group, an alkenyl group, and an aryl group, with the proviso that fewer than all of $R_4$ through $R_8$ are H; or $R_4$ through $R_6$ are independently selected from H, an alkyl group, an alicyclic group, an alkenyl group, and an aryl group, and $R_7$ and $R_8$ taken together with the N to which they are both bonded form a heterocyclic ring;

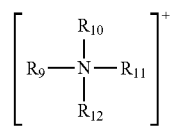

wherein:
$R_9$ is H, an alkyl group, an alkylamine group, or an alicyclic group; $R_{10}$ is an alkyl group or an alkylamine group; $R_{11}$ and $R_{12}$ are independently selected from H and an alkyl group; and

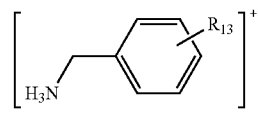

wherein $R_{13}$ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X' through a carbon atom;

wherein the article is photochromic.

In a second embodiment, the present disclosure provides a method of forming a photochromic film including forming a composition containing a polymer or a precursor of the polymer and a polyoxometalate derivative and counter cation complex distributed in the polymer and preparing a film from the composition. The film includes the polyoxometalate derivative and counter cation complex according to the first embodiment distributed in the polymer or precursor of the polymer. The film is photochromic. Preferably, the polymer does not participate stoichiometrically in a photochromic redox reaction of the polyoxometalate derivative and counter cation complex.

In a third embodiment, the present disclosure provides precursor compositions for the formation of articles comprising a polymer and a polyoxometalate derivative and counter cation complex comprising a polyoxometalate derivative anion and a counter cation. In certain aspects of the third embodiment, the precursor composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM derivative and counter cation complex (i.e., the polyoxometalate derivative anion and counter cation complex) may be dissolved in the composition or may be dispersed in the composition. In some embodiments, the polyoxometalate derivative and counter cation complex is dissolved or dispersed in a monomer. In the precursor compositions of the third embodiment, the polyoxometalate derivative anion and the counter cation may be dissociated. The polyoxometalate derivative anion is of formula (I). The counter cation is one or more of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation.

Various unexpected results and advantages are obtained in exemplary embodiments of the disclosure. One such advantage of certain exemplary embodiments of the present disclosure is that the relative inertness of the polymer during photochromic cycling decreases the degradation of the polymer during the use of the article.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

As noted above, technical challenges prevent photochromic technology from entering various commercial markets, including challenges such as durability, fatigue, and switching time. The organic dyes that have been used in a majority of the photochromic systems are degraded by light and oxygen and thus their lifetimes suffer. The present disclosure provides articles and methods for making articles containing a photochromic polyoxometalate complex.

Inorganic-organic hybrid materials based on polyoxometalate anions with organic functionalities which have been combined either electrostatically (cation-anion interactions) or covalently (eg. substitution of an organic group for a W—O moiety) are provided to give materials that exhibit reversible photochromism in the solid state. It has been discovered that some, but not all, polyoxometalate derivative anions and counter cation complexes exhibit photochromism. Furthermore, it has been discovered that some polyoxometalate derivative and counter cation complexes are suitable for distribution in polymers, for example distribution in inert polymers or polymers that do not participate stoichiometrically in a photochromic redox reaction of the polyoxometalate derivative and counter cation complex, to give photochromic articles of high optical quality and photochromic performance, for example photochromic films, coatings, adhesives, optical elements, and inks. For instance, the polyoxometalate derivative anion may include lacunary heteropolyoxometalates of tungsten or molybdenum, in which the hetero atom is Si, P, B, etc. The heteropolyoxometalate preferably is derivatized with at least one organoammonium countercation bonded to a hetero atom to enhance the reversibility of the photochromic response of the material. Such materials can then be incorporated into a polymer matrix and used as optical films. Optical films may be used in, but are not limited to, applications including window films, lenses, displays, indicators, architectural glazings, automotive glazings, sensors, optical memory devices, and security features on documents. Such materials can then be incorporated into a polymer matrix and used as adhesives, optical elements (e.g., ophthalmic lenses), coatings, inks, and glazings.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "polyoxometalate anion" (abbreviated POM anion) refers to a discrete oxygen cluster anion generally of early transition metals, which may also include one or more of a variety of heteroatoms and that has a defined molecular structure and lacks polydispersity. Polyoxometalate anions form a structurally distinct class of complexes based predominately, although not exclusively, upon quasi-octahedrally-coordinated metal atoms. The $MO_6$ units are joined together through shared edges and/or vertices, or, less commonly, faces. Heteroatoms may be present in polyoxometalates. Different elements can act as heteroatoms, with various coordination numbers: 4-coordinate (tetrahedral) in Keggin and Wells-Dawson structures (e.g., $PO_4$, $SiO_4$); 6-coordinate (octahedral) in Anderson structure (e.g. $Al(OH)_6$, $TeO_6$); and 8-coordinate (square antiprism) e.g. $((CeO_8)W_{10}O_{28})^{8-}$.

A "lacunary polyoxometalate" refers to any poloxometalate cluster anion which is deficient in one or more addenda metals creating at least one vacant site on the cluster. The vacant site allows for chemical modification of the POM, for instance, covalent tethering of organic groups through a siloxane linker. The chemical modification of a POM anion using covalent tethering of an organic group through a siloxane linker is an example of organic modification of a POM. Such clusters are termed "derivatives of POMs", "POM derivatives", or "polyoxometalate derivatives" herein. In most, but not all, cases the free lacunary polyanion is also independently stable and isolable.

Thus, the term "polyoxometalate anion" is applied to a group of discrete anionic clusters with frameworks built from transition metal polyhedra linked by shared oxo ligands. The term is generally applied to clusters of 3 or more transition metal atoms from group 5 and group 6 in their high oxidation states, (d0 and d1 configuration), e.g. V(V), Nb(V), Ta(V), Mo(VI) and W(VI).

A salt from a POM anion and a counter-cation (that is not a proton) is called a "POM salt complex". POM salt complexes dissociate into their respective POM anions and counter cations when dissolved in a solvent, like a typical salt (e.g. NaCl in water).

A "dissolved polyoxometalate anion" (abbreviated dissolved POM anion) refers to a polyoxometalate (or polyoxometalate derivative) in its discrete molecular state, dissolved in (i.e., solvated by), for example, a polymer and/or a solvent.

A "polyoxometalate derivative and counter cation complex" refers to a polyoxometalate derivative anion associated with one or more cations (herein referred to as counter cations) through ionic bonding. Thusly, a polyoxometalate derivative and counter cation complex comprises at least one polyoxometalate derivative anion and at least one counter cation. The counter cations of the present disclosure are not polymeric. For example, when a polyoxometalate derivative and counter cation complex is distributed in a polymer, according to the present disclosure, the counter cations are not a constituent of the polymer (i.e., the counter cations are not covalently bonded to the polymer). When distributed in a polymer (e.g., as part of an article), a polymer precursor composition, liquid solution, fluid dispersion, or powder, the proportion (or stated differently as concentration or amount) of polyoxometalate derivative and counter cation complex is given by the weight percent (also abbreviated as wt % herein) of the following components relative to the overall weight of the article, polymer precursor composition, liquid solution, fluid dispersion, or powder: polyoxometalate derivative anions plus all associated counter cations plus all associated waters of hydration (when the polyoxometalate derivative and counter cation complex is in the solid state). Typically, the waters of hydration are up to 10 wt % of the total polyoxometalate derivative and counter cation complex. Polyoxometalate derivative and counter cation complexes are also referred to herein as POM derivative and counter cation complexes.

A "polyoxometalate derivative and counter cation complex particle" (abbreviated POM derivative and counter cation complex particle) refers to polyoxometalate derivative anions in an aggregated state (i.e., not dissolved, but rather for instance dispersed) along with counter cations (like those described in the text below) and optionally any waters of hydration. A polyoxometalate derivative and counter cation complex particle may be amorphous or crystalline. POM derivative and counter cation complex particles can include POM salt complex particles, for example POM salt complex crystals.

Herein, polyoxometalate derivative and counter cation complex (abbreviated POM derivative and counter cation complex) may be either aggregated (i.e. POM derivative and counter cation complex particle) and molecular states (i.e. dissolved POM derivative anion and counter cation, associated).

The term "photochromic article" refers to an article which reversibly changes its absorption properties (i.e. color) caused by a photochemical reaction within the material upon exposure to specific wavelengths of electromagnetic radiation. In the present text, the term shall be applied to articles which exhibit a reversible change in transmission or reflection of 5% or more.

The phrase "the polymer does not participate in a photochromic reaction of the polyoxometalate and counter cation complex" means that there is no reaction mechanism that can be described as a stoichiometric reaction between the polyoxometalate derivative anion and the polymer matrix and that accounts for the majority of the observed absorbance change in a photochromic article upon exposure to electromagnetic radiation.

The term "(co)polymer" refers to polymers containing two or more different monomers.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group. The term "alkenyl group" means a saturated hydrocarbon group bonded to an unsaturated hydrocarbon group.

The term "aliphatic group" means a saturated or unsaturated linear or branched hydrocarbon group. This term is used to encompass alkyl, alkenyl, and alkynyl groups, for example.

The term "heteroalkyl group" means an alkyl group having at least one —CH$_2$— replaced with a heteroatom such as O or S.

The term "alicyclic group" means a cyclic hydrocarbon group having properties resembling those of aliphatic groups. The term "heterocyclic group" means a cyclic aliphatic group having at least one —CH$_2$— replaced with a heteroatom such as O or S.

The term "amine group" means an organic group containing a nitrogen atom.

The term "alkylamine group" means a saturated linear or branched hydrocarbon group bonded to an amine group.

The term "protonated amine group" means an amine group including at least one hydrogen atom bonded to the nitrogen of the amine.

The term "aromatic group" or "aryl group" means a mono- or polynuclear aromatic hydrocarbon group.

The term "imine group" means a group in which a divalent nitrogen atom is bound to one hydrogen atom and to two alkyl or aryl groups.

The term "(meth)acrylic" or "(meth)acrylate" is inclusive of both acrylic and methacrylic (or acrylate and methacrylate).

When a group is present more than once in a formula described herein, each group is "independently" selected, whether specifically stated or not. For example, when more than one R group is present in a formula, each R group is independently selected.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In a first embodiment, the present disclosure provides a photochromic article including a polymer and a lacunary polyoxometalate derivative and counter cation complex comprising a polyoxometalate derivative anion and a counter cation. The polyoxometalate derivative anion is of the general formula (I):

wherein: X is a heteroatom selected from Si, B, P, Ge, or As;
z is from 3 to 6;
M is W, Ta, Nb, or Mo;
X' is a heteroatom or group containing a heteroatom, selected from Si—O—Si, P, Ge, Ti, Sn, or As;
y is from 1 to 2, wherein when X' is Si—O—Si y is 2 and one L is bound to each Si atom;
L is of formula (II), an alkylguanidine group, an alicyclic group, an aliphatic group, or an aryl group;

wherein:
R$_1$ is an alkylene group and R$_2$ and R$_3$ are independently selected from H, an alkyl group, an alkenyl group, an alkylamine group, an amide group, an imine group, a heterocyclic group, an aryl group, or an alicyclic group; and
the counter cation is one or more of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, or a monoatomic cation; with the proviso that when the counter cation is a monoatomic cation L is an alkylamine group or an alkylguanidine group;

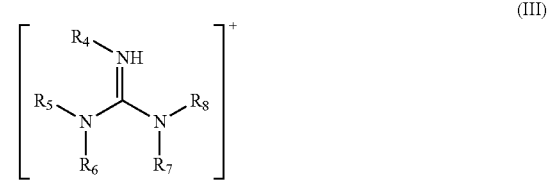

wherein:
R$_4$ through R$_8$ are independently selected from H, an alkyl group, an alicyclic group, an alkenyl group, and an aryl group, with the proviso that fewer than all of R$_4$ through R$_8$ are H; or R$_4$ through R$_6$ are independently selected from H, an alkyl group, an alicyclic group, an alkenyl group, and an aryl group, and R$_7$ and R$_8$ taken together with the N to which they are both bonded form a heterocyclic ring;

wherein:
R$_9$ is H, an alkyl group, an alkylamine group, or an alicyclic group; R$_{10}$ is an alkyl group or an alkylamine group; R$_{11}$ and R$_{12}$ are independently selected from H and an alkyl group; and

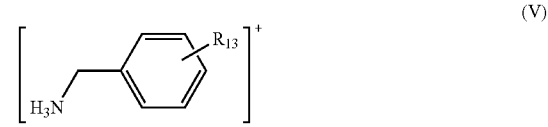

wherein R$_{13}$ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X' through a carbon atom. The article is photochromic.

The one or more early transition metal optionally includes M as being W or Mo. The heteroatom, X is typically silicon (Si), boron (B), phosphorous (P), or germanium (Ge). In certain embodiments, X' is Si—O—Si. The negative charge, q, of the polyoxometalate derivative anion is from 3 to 6, such as 3, 4, or 5. Typically, the number of charges given by counter cations matches the charge of the POM derivative anion, q, to provide an uncharged complex. In aspects where at least one monatomic counter cationic is included, however, the number of charges given by the counter cations will concomitantly be decreased. In certain embodiments, the charges of the POM derivative anion and the counter cation will not add up to zero and the complex will be charged. The number of counter cations can vary, typically from 3 to 6, and may be represented by j, for example:

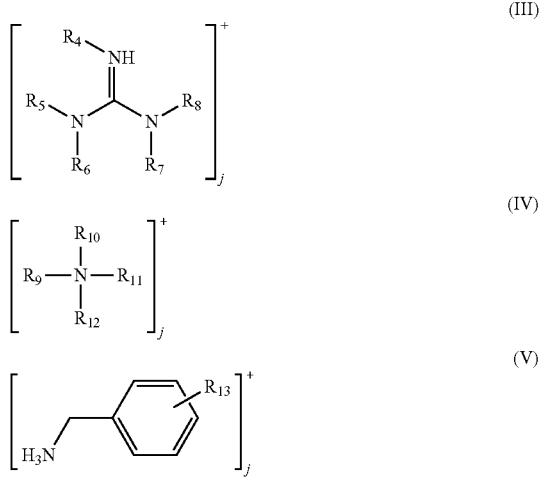

Advantageously, the inclusion of organic groups bound to the X' (e.g., bound to siloxanes) may further enhance the stability of POM in the polymer. In one particular aspect, X' is Si—O—Si, L is propylamine, the cation is $[CH_3NHCNH_2NH_2]^+$, z is 3, and X is P. In another aspect, X' is Si—O—Si, L is butyl, the cation is $[CH_3NHCNH_2NH_2]^+$, z is 4, and X is Si.

In certain aspects of a lacunary polyoxometalate derivative, $R_2$ and $R_3$ are each H and $R_1$ is an alkylene group, and optionally the early transition metal, M, is W.

In a particular aspect, L is propylguanidine hydrochloride, the cation is tetrabutylammonium, z is 3, and X is P. In another aspect, L is propylguanidine hydrochloride, the cation is potassium, z is 4, and X is Si. In a further aspect, L is propylamine, the cation is tetrabutylammonium, z is 3, and X is P. In an additional aspect, L is butylamine, the cation is potassium, z is 4, and X is Si. In a still further aspect, L is N-(2-aminoethyl)-3-aminopropyl, the cation is potassium, z is 4, and X is Si. In still another aspect, L is butyl, the cation is methylguanidinium, z is 4, and X is Si. In an additional specific aspect, L is propylamine, the cation is potassium, z is 4, and X is Si. When the counter cation is a monatomic cation, it is preferably selected from sodium, potassium, and lithium.

The polymer in the present disclosure advantageously does not participate stoichiometrically in a photochromic redox reaction of the POM derivative and counter cation complex (i.e., the polyoxometalate derivative anion and counter cation complex). Contrasting compositions in the art include polyoxometalates distributed in polymers wherein the polymer does participate in the photochromic redox reaction of the polyoxometalates. For example, contrasting compositions in the art include polymers such as polyethyleneimine (also referred to as PEI) or polyvinylalcohol (also referred to as PVA), which are known to react photochemically with polyoxometalates to reduce the POM and induce a color change (photochromism). Participation, particularly stoichiometrically, by the polymer matrix of a material in a photochromic redox reaction with a polyoxometalate distributed therein creates a potential pathway for photolytic degradation of the polymer, and loss of physical or chemical integrity for the overall material, or other potentially important properties (e.g., optical transparency). The approach taken with the compositions of the present disclosure (of distributing the polyoxometalate derivative and counter cation complex within a separate polymer that does not participate stoichiometrically in the photochromic redox reaction) includes decoupling the photochromic redox reaction from such other demands on a polymer (e.g., photochemical durability) having polyoxometalates distributed therein.

The polymer in the present disclosure preferably comprises polymethylmethacrylate (PMMA), poly(butyl acrylate), poly(tetrahydrofurfural acrylate), poly(iso-octyl acrylate), poly(isobornyl acrylate), poly(hydroxyethyl acrylate), polymethylmethacrylate copolymer, or a combination thereof. In certain aspects, the polymer comprises PMMA or a combination of PMMA with 1,6-hexanediol diacrylate. The inclusion of organic groups in the polyoxometalate derivative anion or in the counter cation may further enhance the stability of POM derivative and counter cation complex in the polymer. The polymers identified above can advantageously form articles, for instance films, which retain their structural integrity when containing POM particles distributed therein. In certain embodiments, the POM particles are contained in only a portion of the article.

To maximize even photochromic properties throughout the article, the POM derivative and counter cation complex is preferably homogeneously distributed in the polymer. Typically, the article is in the form of a film. The article is optionally in the form of a plurality of pellets, which may then be incorporated into any number of different articles. In some embodiments, the article is in the form of a coating on a substrate. In some embodiments the article is in the form of an adhesive composition, for example a pressure sensitive adhesive, also referred to herein as a PSA (e.g., and acrylic PSA or silicone PSA). In some embodiments, the article is in the form of an optical element, for example an ophthalmic lens.

The proportion (or stated differently as concentration or amount) of polyoxometalate derivative and counter cation complex provided in the articles is not particularly limited, although certain amounts are typical. The articles include at least 5% by weight of the POM derivative and counter cation complex, at least 10% by weight, at least 15% by weight, at least 20% by weight, or even at least 25% by weight of the POM derivative and counter cation complex. The articles include up to 30% by weight of the POM derivative and counter cation complex, up to 40% by weight, up to 50% by weight, up to 60% by weight, up to 70% by weight, or even up to 80% by weight of the POM derivative and counter cation complex. For instance, an article comprises 5% by weight to 80% by weight of the POM derivative and counter cation complex, or 10% by weight to 50% by weight of the POM derivative and counter cation complex, or even 15% by weight to 30% by weight of the POM derivative and counter cation complex. As noted above, the percent by weight of the POM derivative and counter cation complex typically includes up to 10 wt % of waters of hydration. If the amount of POM derivative and counter cation complex in the article is too low, the article will not exhibit sufficient photochromism. If the amount of POM derivative and counter cation complex in the article is too high, the POM derivative and counter cation complex may interfere with the integrity of the polymer in maintaining the structure of the article.

POM derivative and counter cation complex particles can be obtained from dissolved POM derivative anions and counter cations by drying (e.g. evaporation, spray drying, lyophilization) of a POM derivative and counter cation complex containing solution, followed by grinding or dispersing the solid residue, or by precipitation or crystallization from a POM derivative anion and counter cation containing solution and collection of the resulting solid by filtration. The selection of the counter cation can determine the ultimate solubility of a POM derivative and counter cation complex in a given polymer as well as determine the photochromic activity of the POM derivative and counter cation complex. The articles disclosed herein may not only comprise one type of POM derivative and counter cation complex, but rather at least one, two, three, four, five, six or more POM derivative and counter cation complexes of different chemical formulae. POM derivative and counter cation complexes can be produced according to processes described in the prior art and known to the skilled person. Examples of how to produce POM derivative and counter cation complexes are given in the Example section below.

In certain embodiments, a suitable molecular size of a POM derivative anion is from about 0.5 to about 5 nm; with a molecular weight: from about 800 to about 10,000 g/mol. A molecular size within this range can be beneficial in particular to provide a highly translucent material. Suitable particle size ranges for POM derivative and counter cation complex particles is from about 5 nm to about 50 µm, from about 7.5 nm to about 25 µm, or from about 10 nm to 10 µm. Typically, the density of the POM derivative and counter cation complex particles ranges from about 1 g/cm³ to about 5 g/cm³ or from about 1.5 g/cm³ to about 2.5 g/cm³. The shape of the POM derivative and counter cation complex particles is not particularly limited, and can be for instance, cylindrical, platelet, spherical, prolate ellipsoid, oblate ellipsoid, needle-like, polyhedral or irregular.

In a second embodiment, the present disclosure provides a method of forming a photochromic film including forming a composition containing a polymer or a precursor of the polymer and a polyoxometalate derivative and counter cation complex distributed in the polymer and preparing a film from the composition. The film is photochromic. The film includes the polyoxometalate derivative and counter cation complex distributed in the polymer. The polymer typically does not participate stoichiometrically in a photochromic redox reaction of the polyoxometalate derivative and counter cation complex.

In certain aspects of the second embodiment, the composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM derivative and counter cation complex (i.e., the polyoxometalate derivative and counter cation complex) may be dissolved in the composition or may be dispersed in the composition. In aspects including a solvent in the composition, the method of forming a photochromic film typically further comprises removing at least some of the solvent from the composition, particularly in aspects wherein the preparing the film comprises extruding the composition (e.g., solvent is removed before the film is extruded). As an alternative to extrusion, the preparing of the photochromic film may comprise casting the composition and drying (i.e., removing solvent from) the cast composition. Preferably, preparing the film comprises drying the composition in an atmosphere comprising less than 50% relative humidity, or less than 40%, or less than 30%, or less than 20%, or even less than 10% relative humidity. When the composition contains a precursor of a polymer, the preparing of the photochromic film further comprises curing the precursor of the polymer by polymerization (e.g., by thermal polymerization or photopolymerization). In some embodiments, preparing the photochromic film includes curing the polymer by crosslinking (e.g., by electron beam irradiation, UV irradiation, or heating). Other suitable known methods of forming a film will be apparent to the skilled practitioner.

In a third embodiment, the present disclosure provides a precursor composition for forming a photochromic article, the precursor composition comprising a polymer or a precursor of the polymer and a polyoxometalate derivative and counter cation complex comprising a polyoxometalate derivative anion and a counter cation, wherein the precursor composition is a fluid. Typically, the polymer does not participate stoichiometrically in a photochromic redox reaction of the polyoxometalate derivative and counter cation complex. In certain aspects of the third embodiment, the precursor composition further comprises a solvent, for instance a solvent comprising water or an organic solvent, and the polymer or precursor of the polymer is dissolved in the solvent. Suitable organic solvents include for example and without limitation, acetonitrile and/or methylethyl ketone. The POM derivative and counter cation complex (i.e., the polyoxometalate derivative and counter cation complex) may be dissolved in the composition or may be dispersed in the composition. In some embodiments, the polyoxometalate derivative and counter cation complex is dissolved or dispersed in a monomer. The polyoxometalate derivative anion is of formula (I). The counter cation is of formula (II), of formula (III), of formula (IV), a phenylalanine cation, an alanine cation, an arginine cation, a glycine cation, a histidine cation, a proline cation, an aniline cation, a N,N-dimethylaminopyridine cation, a morpholine cation, or a piperazine cation.

The articles and precursor compositions of the present disclosure, particularly the photochromic films, may also contain one or more conventional additives. Preferred additives include tackifiers, plasticizers, dyes, antioxidants, and UV stabilizers. Such additives can be used if they do not affect the photochromic properties, for example, of the film.

Exemplary Embodiments

Embodiment 1 is a photochromic article comprising:
a polymer; and
a polyoxometalate derivative and counter cation complex comprising a polyoxometalate derivative anion and a counter cation distributed in the polymer;
wherein the polyoxometalate derivative anion is of the general formula (I):

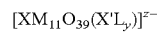    (I)

wherein: X is a heteroatom selected from Si, B, P, Ge, or As;

z is from 3 to 6;

M is W, Ta, Nb, or Mo;

X' is a heteroatom or group containing a heteroatom, selected from Si—O—Si, P, Ge, Ti, Sn, or As;

y is from 1 to 2, wherein when X' is Si—O—Si y is 2 and one L is bound to each Si atom;

L is of formula (II), an alkylamine group, an alkylguanidine group, an alicyclic group, an aliphatic group, or an aryl group;

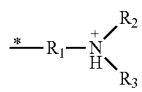
(II)

wherein:

$R_1$ is an alkylene group and $R_2$ and $R_3$ are independently selected from H, an alkyl group, an alkenyl group, an alkylamine group, an amide group, an imine group, a heterocyclic group, an aryl group, or an alicyclic group; and the counter cation is one or more of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

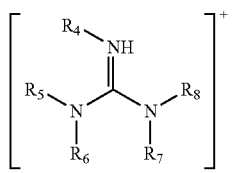
(III)

wherein:

$R_4$ through $R_8$ are independently selected from H, an alkyl group, an alicyclic group, an alkenyl group, and an aryl group, with the proviso that fewer than all of $R_4$ through $R_8$ are H; or $R_4$ through $R_6$ are independently selected from H, an alkyl group, an alicyclic group, an alkenyl group, and an aryl group, and $R_7$ and $R_8$ taken together with the N to which they are both bonded form a heterocyclic ring;

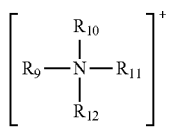
(IV)

wherein:

$R_9$ is H, an alkyl group, an alkylamine group, or an alicyclic group; $R_{10}$ is an alkyl group or an alkylamine group; $R_{11}$ and $R_{12}$ are independently selected from H and an alkyl group; and

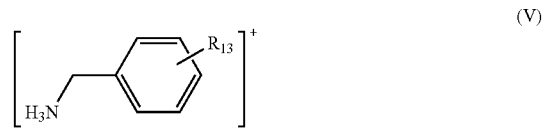
(V)

wherein $R_{13}$ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X' through a carbon atom;

wherein the article is photochromic.

Embodiment 2 is the photochromic article of embodiment 1, wherein the polymer does not participate stoichiometrically in a photochromic redox reaction of the polyoxometalate derivative and counter cation complex.

Embodiment 3 is the photochromic article of embodiment 1 or embodiment 2 wherein y is 2.

Embodiment 4 is the photochromic article of any of embodiments 1 to 3 wherein M is W or Mo.

Embodiment 5 is the photochromic article of any of embodiments 1 to 4 wherein M is W.

Embodiment 6 is the photochromic article of any of embodiments 1 to 5 wherein X is Si, B, P, or Ge.

Embodiment 7 is the photochromic article of any of embodiments 1 to 6 wherein X is Si.

Embodiment 8 is the photochromic article of any of embodiments 1 to 6 wherein X is B.

Embodiment 9 is the photochromic article of any of embodiments 1 to 6 wherein X is P.

Embodiment 10 is the photochromic article of any of embodiments 1 to 6 wherein X is Ge.

Embodiment 11 is the photochromic article of any of embodiments 1 to 10 wherein X' is selected from Si—O—Si, P, Ge, Ti, Sn, and As.

Embodiment 12 is the photochromic article of any of embodiments 1 to 11 wherein X' is Si—O—Si.

Embodiment 13 is the photochromic article of any of embodiments 1, 2, or 4 to 11 wherein X' is P.

Embodiment 14 is the photochromic article of any of embodiments 1, 2, or 4 to 11 wherein X' is Ge.

Embodiment 15 is the photochromic article of any of embodiments 1, 2, or 4 to 11 wherein X' is Ti.

Embodiment 16 is the photochromic article of any of embodiments 1, 2, or 4 to 11 wherein X' is Sn.

Embodiment 17 is the photochromic article of any of embodiments 1, 2, or 4 to 11 wherein X' is As.

Embodiment 18 is the photochromic article of any of embodiments 1 to 17 wherein z is 3.

Embodiment 19 is the photochromic article of any of embodiments 1 to 17 wherein z is 4.

Embodiment 20 is the photochromic article of any of embodiments 1 to 17 wherein z is 5.

Embodiment 21 is the photochromic article of any of embodiments 1 to 20 wherein the article is in the form of a film.

Embodiment 22 is the photochromic article of any of embodiments 1 to 20 wherein the article is in the form of a plurality of pellets.

Embodiment 23 is the photochromic article of any of embodiments 1 to 22 wherein the polymer comprises polymethylmethacrylate (PMMA), poly(butyl acrylate), poly(tetrahydrofurfural acrylate), or a combination thereof.

Embodiment 24 is the photochromic article of any of embodiments 1 to 23 wherein the polymer comprises PMMA.

Embodiment 25 is the photochromic article of any of embodiments 1 to 24 wherein the polymer comprises a combination of PMMA with 1,6-hexanediol diacrylate.

Embodiment 26 is the photochromic article of any of embodiments 1 to 23 wherein the polymer comprises poly (butyl acrylate).

Embodiment 27 is the photochromic article of any of embodiments 1 to 23 wherein the polymer comprises a poly(tetrahydrofurfural acrylate).

Embodiment 28 is the photochromic article of any of embodiments 1 to 27 wherein the polyoxometalate derivative and counter cation complex is homogeneously distributed in the polymer.

Embodiment 29 is the photochromic article of any of embodiments 1 to 4 wherein L is propylguanidine hydrochloride, the cation is tetrabutylammonium, z is 3, X' is Si—O—Si, and X is P.

Embodiment 30 is the photochromic article of any of embodiments 1 to 4 wherein L is propylguanidine hydrochloride, the cation is potassium, z is 4, X' is Si—O—Si, and X is Si.

Embodiment 31 is the photochromic article of any of embodiments 1 to 4 wherein L is propylamine, the cation is tetrabutylammonium, z is 3, X' is Si—O—Si, and X is P.

Embodiment 32 is the photochromic article of any of embodiments 1 to 4 wherein L is butylamine, the cation is potassium, z is 4, X' is Si—O—Si, and X is Si.

Embodiment 33 is the photochromic article of any of embodiments 1 to 4 wherein L is N-(2-aminoethyl)-3-aminopropyl, the cation is potassium, z is 4, X' is Si—O—Si, and X is Si.

Embodiment 34 is the photochromic article of any of embodiments 1 to 4 wherein L is propylamine, the cation is tetrabutylammonium, z is 3, X' is Si—O—Si, and X is P.

Embodiment 35 is the photochromic article of any of embodiments 1 to 4 wherein L is butyl, the cation is methylguanidinium, z is 4, X' is Si—O—Si, and X is Si.

Embodiment 36 is the photochromic article of any of embodiments 1 to 4 wherein L is propylamine, the cation is potassium, z is 4, X' is Si—O—Si, and X is Si.

Embodiment 37 is the photochromic article of any of embodiments 1 to 4 wherein L is propylamine, the cation is $[CH_3NHCNH_2NH_2]^+$, z is 3, and X is P.

Embodiment 38 is the photochromic article of any of embodiments 1 to 4 wherein L is butyl, the cation is $[CH_3NHCNH_2NH_2]^+$, z is 4, and X is Si.

Embodiment 39 is the photochromic article of any of embodiments 1 to 4 wherein the cation is a monatomic cation selected from sodium, potassium, and lithium.

Embodiment 40 is a method of forming a photochromic film comprising:

forming a composition comprising a polymer or a precursor of the polymer and a polyoxometalate derivative and counter cation complex comprising a polyoxometalate derivative anion and a counter cation distributed in the polymer; and preparing a film from the composition, the film comprising the polyoxometalate derivative and counter cation complex distributed in the polymer;

wherein the polyoxometalate derivative anion is of formula (I):

$$([XM_{11}O_{39}(X'L_y)]^{z-} \tag{I}$$

wherein: X is a heteroatom selected from Si, B, P, Ge, or As;

z is from 3 to 6;

M is W, Ta, Nb, or Mo;

X' is a heteroatom or group containing a heteroatom, selected from Si—O—Si, P, Ge, Ti, Sn, or As;

y is from 1 to 2, wherein when X' is Si—O—Si y is 2 and one L is bound to each Si atom;

L is of formula (II), an alkylamine group, an alkylguanidine group, an alicyclic group, an aliphatic group, or an aryl group;

wherein:

$R_1$ is an alkylene group and $R_2$ and $R_3$ are independently selected from H, an alkyl group, an alkenyl group, an alkylamine group, an amide group, an imine group, a heterocyclic group, an aryl group, or an alicyclic group; and the counter cation is one or more of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

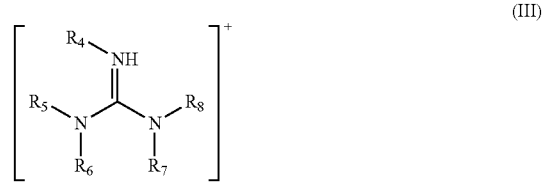

wherein:

$R_4$ through $R_8$ are independently selected from H, an alkyl group, an alicyclic group, an alkenyl group, and an aryl group, with the proviso that fewer than all of $R_4$ through $R_8$ are H; or $R_4$ through $R_6$ are independently selected from H, an alkyl group, an alicyclic group, an alkenyl group, and an aryl group, and $R_7$ and $R_8$ taken together with the N to which they are both bonded form a heterocyclic ring;

wherein:

$R_9$ is H, an alkyl group, an alkylamine group, or an alicyclic group; $R_{10}$ is an alkyl group or an alkylamine group; $R_{11}$ and $R_{12}$ are independently selected from H and an alkyl group; and

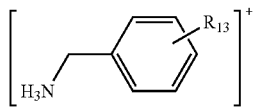
(V)

wherein $R_{13}$ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X' through a carbon atom;

wherein the film is photochromic.

Embodiment 41 is the method of embodiment 40, wherein the polymer does not participate stoichiometrically in a photochromic redox reaction of the polyoxometalate derivative and counter cation complex.

Embodiment 42 is the method of embodiment 40 or embodiment 41 wherein the composition further comprises a solvent and the polymer or precursor of the polymer is dissolved in the solvent.

Embodiment 43 is the method of any of embodiments 40 to 42 wherein the polyoxometalate derivative and counter cation complex is dissolved in the composition.

Embodiment 44 is the method of any of embodiments 40 to 42 wherein the polyoxometalate derivative and counter cation complex is dispersed in the composition.

Embodiment 45 is the method of embodiment 42 further comprising removing at least some of the solvent from the composition.

Embodiment 46 is the method of any of embodiments 40, 41, or 43 to 45 wherein the preparing comprises extruding the composition.

Embodiment 47 is the method of any of embodiments 40 to 45 wherein the preparing comprises casting the composition and drying the cast composition.

Embodiment 48 is the method of any of embodiments 40 to 47 wherein the preparing further comprises curing the precursor of the polymer.

Embodiment 49 is the method of any of embodiments 40 to 48 wherein the film comprises 5% by weight to 80% by weight of the polyoxometalate derivative and counter cation complex.

Embodiment 50 is the method of any of embodiments 40 to 49 wherein the film comprises 10% by weight to 50% by weight of the polyoxometalate derivative and counter cation complex.

Embodiment 51 is the method of any of embodiments 40 to 50 wherein the film comprises 15% by weight to 30% by weight of the polyoxometalate derivative and counter cation complex.

Embodiment 52 is the method of embodiment 42 wherein the solvent comprises water or an organic solvent.

Embodiment 53 is the method of embodiment 42 or embodiment 52 wherein the solvent comprises acetonitrile.

Embodiment 54 is the method of any of embodiments 40 to 53 wherein preparing the film comprises drying the composition in an atmosphere comprising less than 50% relative humidity.

Embodiment 55 is the method of any of embodiments 40 to 54 wherein the polymer comprises polymethylmethacrylate (PMMA), poly(butyl acrylate), poly(tetrahydrofurfural acrylate), or a combination thereof.

Embodiment 56 is the method of any of embodiments 40 to 55 wherein the polymer comprises PMMA.

Embodiment 57 is the method of any of embodiments 40 to 56 wherein the polymer comprises a combination of PMMA with 1,6-hexanediol diacrylate.

Embodiment 58 is the method of any of embodiments 40 to 55 wherein the polymer comprises poly(butyl acrylate).

Embodiment 59 is the method of any of embodiments 40 to 55 wherein the polymer comprises a poly(tetrahydrofurfural acrylate).

Embodiment 60 is the method of any of embodiments 40 to 59 wherein y is 2.

Embodiment 61 is the method of any of embodiments 40 to 60 wherein M is W or Mo.

Embodiment 62 is the method of any of embodiments 40 to 61 wherein M is W.

Embodiment 63 is the method of any of embodiments 40 to 62 wherein X is Si, B, P, or Ge.

Embodiment 64 is the method of any of embodiments 40 to 63 wherein X is Si.

Embodiment 65 is the method of any of embodiments 40 to 63 wherein X is B.

Embodiment 66 is the method of any of embodiments 40 to 63 wherein X is P.

Embodiment 67 is the method of any of embodiments 40 to 63 wherein X is Ge.

Embodiment 68 is the method of any of embodiments 40 to 67 wherein X' is selected from Si—O—Si, P, Ge, Ti, Sn, and As.

Embodiment 69 is the method of any of embodiments 40 to 68 wherein X' is Si—O—Si.

Embodiment 70 is the method of any of embodiments 40 to 59 or 61 to 68 wherein X' is P.

Embodiment 71 is the method of any of embodiments 40 to 59 or 61 to 68 wherein X' is Ge.

Embodiment 72 is the method of any of embodiments 40 to 59 or 61 to 68 wherein X' is Ti.

Embodiment 73 is the method of any of embodiments 40 to 59 or 61 to 68 wherein X' is Sn.

Embodiment 74 is the method of any of embodiments 40 to 59 or 61 to 68 wherein X' is As.

Embodiment 75 is the method of any of embodiments 40 to 74 wherein z is 3.

Embodiment 76 is the method of any of embodiments 40 to 74 wherein z is 4.

Embodiment 77 is the method of any of embodiments 40 to 74 wherein z is 5.

Embodiment 78 is the method of any of embodiments 40 to 77 wherein the polyoxometalate derivative and counter cation complex is homogeneously distributed in the polymer.

Embodiment 79 is the method of any of embodiments 40 to 61 wherein L is propylguanidine or a salt thereof, the cation is tetrabutylammonium, z is 3, X' is Si—O—Si, and X is P.

Embodiment 80 is the method of any of embodiments 40 to 61 wherein L is propylguanidine or a salt thereof, the cation is potassium, z is 4, X' is Si—O—Si, and X is Si.

Embodiment 81 is the method of any of embodiments 40 to 61 wherein L is propylamine, the cation is tetrabutylammonium, z is 3, X' is Si—O—Si, and X is P.

Embodiment 82 is the method of any of embodiments 40 to 61 wherein L is butylamine, the cation is potassium, z is 4, X' is Si—O—Si, and X is Si.

Embodiment 83 is the method of any of embodiments 40 to 61 wherein L is N-(2-aminoethyl)-3-aminopropyl, the cation is potassium, z is 4, X' is Si—O—Si, and X is Si.

Embodiment 84 is the method of any of embodiments 40 to 61 wherein L is propylamine, the cation is tetrabutylammonium, z is 3, X' is Si—O—Si, and X is P.

Embodiment 85 is the method of any of embodiments 40 to 61 wherein L is butyl, the cation is methylguanidinium, z is 4, X' is Si—O—Si, and X is Si.

Embodiment 86 is the method of any of embodiments 40 to 61 wherein L is propylamine, the cation is potassium, z is 4, X' is Si—O—Si, and X is Si.

Embodiment 87 is the method of any of embodiments 40 to 61 wherein the cation is a monatomic cation selected from sodium, potassium, and lithium.

Embodiment 88 is a precursor composition for forming a photochromic article, the precursor composition comprising:
a polymer or a precursor of the polymer; and
a polyoxometalate derivative and counter cation complex comprising a polyoxometalate derivative anion and a counter cation;
wherein the polyoxometalate derivative anion is of formula (I):

$$([XM_{11}O_{39}(X'L)]^{z-}) \quad (I)$$

wherein: X is a heteroatom selected from Si, B, P, Ge, or As;
z is from 3 to 6;
M is W, Ta, Nb, or Mo;
X' is a heteroatom or group containing a heteroatom, selected from Si—O—Si, P, Ge, Ti, Sn, or As;
y is from 1 to 2, wherein when X is Si—O—Si y is 2 and one L is bound to each Si atom;
L is of formula (II), an alkylamine group, an alkylguanidine group, an alicyclic group, an aliphatic group, or an aryl group;

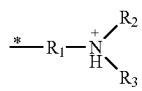

(II)

wherein:
$R_1$ is an alkylene group and $R_2$ and $R_3$ are independently selected from H, an alkyl group, an alkenyl group, an alkylamine group, an amide group, an imine group, a heterocyclic group, an aryl group, or an alicyclic group; and
the counter cation is one or more of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, or a monatomic cation; with the proviso that when the counter cation is a monatomic cation L is an alkylamine group or an alkylguanidine group;

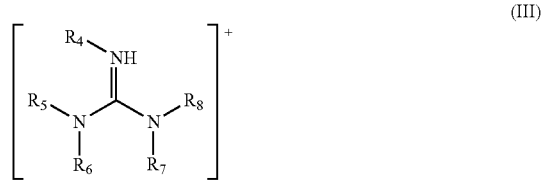

(III)

wherein:
$R_4$ through $R_8$ are independently selected from H, an alkyl group, an alicyclic group, an alkenyl group, and an aryl group, with the proviso that fewer than all of $R_4$ through $R_8$ are H; or $R_4$ through $R_6$ are independently selected from H, an alkyl group, an alicyclic group, an alkenyl group, and an aryl group, and $R_7$ and $R_8$ taken together with the N to which they are both bonded form a heterocyclic ring;

(IV)

wherein:
$R_9$ is H, an alkyl group, an alkylamine group, or an alicyclic group; $R_{10}$ is an alkyl group or an alkylamine group; $R_{11}$ and $R_{12}$ are independently selected from H and an alkyl group; and

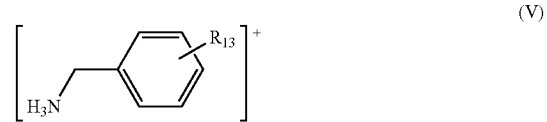

(V)

wherein $R_{13}$ is C≡N, an alkoxy group, an alkyl group, an alkenyl group, or an aryl group;
with the proviso that if L is an alicyclic group, an aliphatic group, or an aryl group then the counter cation contains a protonated amine group, wherein L is bonded to X' through a carbon atom.

Embodiment 89 is the precursor composition of embodiment 88, further comprising a solvent and the polymer or precursor of the polymer is dissolved in the solvent.

Embodiment 90 is the precursor composition of embodiment 88 or embodiment 89, wherein y is 2.

Embodiment 91 is the precursor composition of any of embodiments 88 to 90 wherein M is W or Mo.

Embodiment 92 is the precursor composition of any of embodiments 88 to 91 wherein M is W.

Embodiment 93 is the precursor composition of any of embodiments 88 to 92 wherein X is Si, B, P, or Ge.

Embodiment 94 is the precursor composition of any of embodiments 88 to 93 wherein X is Si.

Embodiment 95 is the precursor composition of any of embodiments 88 to 93 wherein X is B.

Embodiment 96 is the precursor composition of any of embodiments 88 to 93 wherein X is P.

Embodiment 97 is the precursor composition of any of embodiments 88 to 93 wherein X is Ge.

Embodiment 98 is the precursor composition of any of embodiments 88 to 97 wherein X' is selected from Si—O—Si, P, Ge, Ti, Sn, and As.

Embodiment 99 is the precursor composition of any of embodiments 88 to 98 wherein X' is Si—O—Si.

Embodiment 100 is the precursor composition of any of embodiments 88, 89, or 91 to 98 wherein X' is P.

Embodiment 101 is the precursor composition of any of embodiments 88, 89, or 91 to 98 wherein X' is Ge.

Embodiment 102 is the precursor composition of any of embodiments 88, 89, or 91 to 98 wherein X' is Ti.

Embodiment 103 is the precursor composition of any of embodiments 88, 89, or 91 to 98 wherein X' is Sn.

Embodiment 104 is the precursor composition of any of embodiments 88, 89, or 91 to 98 wherein X' is As.

Embodiment 105 is the precursor composition of any of embodiments 88 to 104 wherein z is 3.

Embodiment 106 is the precursor composition of any of embodiments 88 to 104 wherein z is 4.

Embodiment 107 is the precursor composition of any of embodiments 88 to 104 wherein z is 5.

Embodiment 108 is the precursor composition of any of embodiments 88 to 107 wherein the precursor composition is in the form of a solution.

Embodiment 109 is the precursor composition of any of embodiments 88 to 107 wherein the precursor composition is in the form of a dispersion.

Embodiment 110 is the precursor composition of any of embodiments 88 to 109 wherein the polymer comprises polymethylmethacrylate (PMMA), poly(butyl acrylate), poly(tetrahydrofurfural acrylate), or a combination thereof.

Embodiment 111 is the precursor composition of any of embodiments 88 to 110 wherein the polymer comprises PMMA.

Embodiment 112 is the precursor composition of any of embodiments 88 to 111 wherein the polymer comprises a combination of PMMA with 1,6-hexanediol diacrylate.

Embodiment 113 is the precursor composition of any of embodiments 88 to 110 wherein the polymer comprises poly(butyl acrylate).

Embodiment 114 is the precursor composition of any of embodiments 88 to 110 wherein the polymer comprises a poly(tetrahydrofurfural acrylate).

Embodiment 115 is the precursor composition of any of embodiments 88 to 114 wherein the polyoxometalate derivative and counter cation complex is homogeneously distributed in the polymer or the precursor of the polymer.

Embodiment 116 is the precursor composition of any of embodiments 88 to 91 wherein L is propylguanidine hydrochloride, the cation is tetrabutylammonium, z is 3, X' is Si—O—Si, and X is P.

Embodiment 117 is the precursor composition of any of embodiments 88 to 91 wherein L is propylguanidine hydrochloride, the cation is potassium, z is 4, X' is Si—O—Si, and X is Si.

Embodiment 118 is the precursor composition of any of embodiments 88 to 91 wherein L is propylamine, the cation is tetrabutylammonium, z is 3, X' is Si—O—Si, and X is P.

Embodiment 119 is the precursor composition of any of embodiments 88 to 91 wherein L is butylamine, the cation is potassium, z is 4, X' is Si—O—Si, and X is Si.

Embodiment 120 is the precursor composition of any of embodiments 88 to 91 wherein L is N-(2-aminoethyl)-3-aminopropyl, the cation is potassium, z is 4, X' is Si—O—Si, and X is Si.

Embodiment 121 is the precursor composition of any of embodiments 88 to 91 wherein L is propylamine, the cation is tetrabutylammonium, z is 3, X' is Si—O—Si, and X is P.

Embodiment 122 is the precursor composition of any of embodiments 88 to 91 wherein L is butyl, the cation is methylguanidinium, z is 4, X' is Si—O—Si, and X is Si.

Embodiment 123 is the precursor composition of any of embodiments 88 to 91 wherein L is propylamine, the cation is potassium, z is 4, X' is Si—O—Si, and X is Si.

Embodiment 124 is the precursor composition of any of embodiments 88 to 91 wherein L is propylamine, the cation is $[CH_3NHCNH_2NH_2]^+$, z is 3, and X is P.

Embodiment 125 is the precursor composition of any of embodiments 88 to 91 wherein L is butyl, the cation is $[CH_3NHCNH_2NH_2]^+$, z is 4, and X is Si.

Embodiment 126 is the precursor composition of any of embodiments 88 to 91 wherein the cation is a monatomic cation selected from sodium, potassium, and lithium.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight.

| Material | Vendor | Product code |
| --- | --- | --- |
| 3-aminopropyltriethoxysilane | TCI America, Portland, OR | A0439 |
| acetonitrile | Burdick & Jackson, Muskegon, MI | AH015AA-4 |
| 3-buten-1-amine | Alfa Aesar, Ward Hill, MA | L20157 |
| dimethylformamide | Alfa Aesar, Ward Hill, MA | 43465 |
| $H_4[SiW_{12}O_{40}]$ | Alfa Aesar, Ward Hill, MA | 39651 |
| hydrochloric acid | EMD Chemicals, Inc., Gibbstown, NJ | HX0603-3 |
| Karstedt's catalyst | Aldrich Chemical Company, Inc., Milwaukee, WI | 479519 |
| methanol | Aldrich Chemical Company, Inc., Milwaukee, WI | 322415 |
| methylethyl ketone | J. T. Baker, Center Valley, PA | 9319-01 |
| 1-methylguanidine hydrochloride | Aldrich Chemical Compnay, Inc., Milwaukee, WI | 22,240-2 |
| N-(2-aminoethyl)-3-aminopropyltrimethoxysilane | Gelest, Inc., Tullytown, PA | SIA0591 |
| 1H-pyrazole-1-carboxamidine hydrochloride | Aldrich Chemical Company, Inc., Milwaukee, WI | 402516 |
| poly(ethyleneimine) | Polysciences, Inc., Warrington, PA | 6088 |
| poly(methyl methacrylate) | Aldrich Chemical Company, Inc., Milwaukee, WI | 18,223-0 |
| poly(metylmethacrylate-n-butylmethacrylate) | Polysciences, Inc., Warrington, PA | 1922 |
| polytetrafluoroethylene | CS Hyde Company, Lake Villa, IL | 15-30F-12 |
| poly(vinyl acetate) | Polysciences, Inc., Warrington, PA | 6069 |
| tetrabutylammonium bromide | Aldrich Chemical Company, Inc., Milwaukee, WI | 193119 |
| triethoxysilane | Alfa Aesar, Ward Hill, MA | B22063 |

Comparative Example 1 (CE-1)

Poly(ethyleneimine) (PEI, $M_n=12,000$, branched, 1.9 g) was dissolved in distilled water (10 mL) and to this solution was added 12-tungstosilicic acid ($H_4[SiW_{12}O_{40}]$) (0.65 g) such that the concentration of $H_4[SiW_{12}O_{40}]$ in the PEI was 25 wt. %. Upon mixing the heteropoly acid (HPA) and PEI a solid precipitated from solution caused by the ionic bonding between the negatively charged HPA and positively charged PEI. Further stirring resulted in a homogeneous solution which could be cast to form a film inside of a glass ring on a polytetrafluoroethylene (PTFE) substrate. The solutions were dried on a 60° C. hot plate overnight. This resulted in a clear solid that was cracked and could not be handled in ambient atmosphere because it was very hygroscopic. Qualitatively, the solids were observed to change colors after 1 minute of irradiation with a 15 W mercury lamp at 365 nm and became dark violet after 5 to 10 minutes of irradiation. Bleaching was observed after >30 minutes in the air at room temperature and the bleaching time could be significantly shortened by placing the PEI/HPA mixture on a 60° C. hotplate. The PEI/HPA was observed to have a yellow coloration after 3-4 color/bleaching cycles.

Example 1 (EX-1)

Potassium 11-tungstosilicate hydrate ($K_8[SiW_{11}O_{39}]\cdot 13 H_2O$) was prepared according to the procedures described in "α-, β-, and γ-Dodecatungstosilicic Acids: Isomers and Related Lacunary Compounds" *Inorganic Syntheses* 1990, 27, 85-96.

Potassium 11-tungstophosphate hydrate ($K_7[PW_{11}O_{39}]\cdot 13 H_2O$) was prepared according to the procedures described in "Polyoxometalate (POM)-based, Multi-functional, Inorganic-organic, Hybrid Compounds: Syntheses and Molecular Structures of Silanol- and/or Siloxane Bond-containing Species Grafted on Mono- and Tri-lacunary Keggin POMs" *Dalton Trans.* 2011, 40, 1243-1253.

Vinylsilane hybrid of tungstosilicate ($K_4[SiW_{11}O_{40}(SiC_2H_3)_2]$) (i.e., a polyoxometalate derivative and counter cation complex) was prepared according to the procedures described in "Synthesis and Properties of Polyoxometalates Based Inorganic-Organic Polymers" *Chem. Mater.* 1992, 4, 4-7.

Phenylsilane hybrid of tungstosilicate ($K_4[SiW_{11}O_{40}(SiC_6H_5)_2]$) (i.e., a polyoxometalate derivative and counter cation complex) was prepared according to the procedures described in "Derivatives of Heteropolyanions. 1. Organic Derivatives of $W_{12}SiO_{40}^{4-}$, $W_{12}PO_{40}^{3-}$, and $Mo_{12}SiO_{40}^{4-}$" *J. Amer. Chem. Soc.* 1979, 100, 759-760.

The 3-aminopropylsilane hybrid of tungstosilicate was synthesized according to the following procedure: To a solution of acetonitrile (40 mL) and distilled water (12 mL) was added $K_8[SiW_{11}O_{39}]\cdot 13 H_2O$ (5.00 g, 1.55 mmol) under vigorous stirring. This mixture was stirred for 5 minutes and then 3-aminopropyltriethoxysilane (0.72 mL, 3.1 mmol) was added. The reaction mixture was stirred another 10 minutes and to this was added concentrated HCl (0.77 mL, 9.3 mmol) dropwise via a syringe. The flask was capped and stirred at ambient temperature for 16 hours. A small amount of white precipitate was removed by filtration giving a clear, colorless solution. The solvent was then removed by rotary evaporation and then under high vacuum. A light blue-gray solid resulted with the molecular formula $K_4[SiW_{11}O_{40}(SiC_3H_6NH_2)_2]$ (i.e., a polyoxometalate derivative and counter cation complex) and was characterized by IR, MALDI-TOF, and NMR spectroscopy.

The N-(2-aminoethyl)-3-aminopropylsilane hybrid of tungstosilicate was synthesized according to the following procedure: To a solution of acetonitrile (40 mL) and distilled water (12 mL) was added $K_8[SiW_{11}O_{39}]\cdot 13H_2O$ (5.00 g, 1.55 mmol) under vigorous stirring. This mixture was stirred for 5 minutes and then N-(2-aminoethyl)-3-aminopropyltrimethoxysilane (0.68 mL, 3.1 mmol) was added. The reaction mixture was stirred another 10 minutes and to this was added concentrated HCl (1.0 mL, 12.4 mmol) dropwise via syringe. The flask was capped and stirred at ambient temperature for 16 hours. A considerable amount of light yellow precipitate was removed by filtration giving a clear, colorless solution. The solvent was then removed by rotary evaporation and then under high vacuum. A light yellow solid resulted with the molecular formula $K_4[SiW_{11}O_{40}(SiC_5H_{13}N_2)_2]$ (i.e., a polyoxometalate derivative and counter cation complex) and was characterized by IR, MALDI-TOF, and NMR spectroscopy.

The propylguanidine hybrid of 11-tungstosilicate was synthesized according to the following procedure: To a 100 mL Schlenk flask equipped with a magnetic stir bar was added (3-aminopropyl)trimethoxysilane (10.0 mL, 57.3 mmol), 1H-pyrazole-1-carboxamidine hydrochloride (8.40 g, 57.3 mmol), and 30 mL of dry methanol. The reaction mixture was then stirred under a nitrogen atmosphere at ambient temperature for 16 hours. The solvent was removed under vacuum and the resulting crude product was purified by vacuum distillation. A light yellow oil resulted with the molecular formula $C_7H_{20}ClN_3O_3Si$ and was characterized by NMR spectroscopy. The product from this reaction was used as a starting material in the synthesis of the following polyoxometalate derivative: To a 100 mL round bottom flask was loaded $K_8[SiW_{11}O_{39}]\cdot 13 H_2O$ (5.00 g, 1.55 mmol) and this was suspended in 30 mL of acetonitrile and 12 mL of water. The 1-(3-trimethoxysilylpropyl)guanidine hydrochloride (0.80 g, 3.1 mmol) was dissolved in 10 mL of acetonitrile and added to the reaction mixture. This was stirred for 10 minutes and then the concentrated HCl (0.77 mL, 9.3 mmol) was added drop wise via syringe over 10 minutes. The flask was capped and the reaction mixture was stirred at ambient temperature for 16 hours. The reaction mixture was filtered by vacuum filtration and the volatile components were removed by rotary evaporation. A light yellow solid resulted with the molecular formula $K_4[SiW_{11}O_{40}(SiN_3C_4H_{10})_2]\cdot 2$ HCl (i.e., a polyoxometalate derivative and counter cation complex) and was characterized by MALDI-TOF and NMR spectroscopy. The tris(tetrabutylammonium) guanidine substituted 11-tungstophosphate was synthesized according to the following procedure: To a suspension of $K_7[PW_{11}O_{39}]\cdot 13 H_2O$ (3.0 g, 0.94 mmol) in 20 mL of acetonitrile was added tetrabutylammonium bromide (1.52 g, 4.7 mmol). The flask containing the reaction mixture was placed in an ice bath and the solution was stirred. The 1-(3-trimethoxysilylpropyl)guanidine hydrochloride (0.53 g, 2.1 mmol) was dissolved in 10 mL of acetonitrile and added to the reaction mixture slowly over 10 minutes and then a 2.5M HCl aqueous solution (1.6 mL, 4.0 mmol) was added drop wise via syringe over 5 minutes. The flask was capped and the reaction mixture was stirred at ambient temperature for 16 hours. The reaction mixture was filtered by vacuum filtration and the volatile components were removed by rotary evaporation. A white solid resulted with the molecular formula $((C_4H_9)_4N)_3[PW_{11}O_{40}(SiN_3C_4H_{10})_2]\cdot 2$ HCl (i.e., a polyoxometalate derivative and counter cation complex) and was characterized by NMR spectroscopy.

The tris(tetrabutylammonium) propylamine substituted 11-tungstophosphate was synthesized according to the following procedure: To a suspension of $K_7[PW_{11}O_{39}] \cdot 13\ H_2O$ (3.0 g, 0.94 mmol) in 30 mL of acetonitrile was added tetrabutylammonium bromide (1.52 g, 4.7 mmol). The flask containing the reaction mixture was placed in an ice bath and the solution was stirred. The 3-aminopropyltriethoxysilane (0.5 mL, 2.1 mmol) was added to the reaction mixture slowly over 10 minutes and then a 2.5M HCl aqueous solution (2.3 mL, 5.6 mmol) was added drop wise via syringe over 5 minutes. The flask was capped and the reaction mixture was stirred at ambient temperature for 16 hours. The reaction mixture was filtered by vacuum filtration and the volatile components were removed by rotary evaporation. The resulting yellow oil was dissolved in 10 mL of DMF and then 8 mL of $H_2O$ was added causing a solid to precipitate from solution which was collected by filtration. A white solid resulted with the molecular formula $((C_4H_9)_4N)_3[PW_{11}O_{40}(SiC_3H_6NH_2)_2]$ (i.e., a polyoxometalate derivative and counter cation complex) and was characterized by NMR spectroscopy.

The 4-aminobutylsilane hybrid of 11-tungstosilicate was synthesized according to the following procedure: To a 100 mL Schlenk flask was added triethoxysilane (2.9 mL, 15.7 mmol) and Karstedt's catalyst (10 drops). The 3-buten-1-amine (1.1 mL, 12 mmol) was then added drop wise via syringe. The reaction mixture was stirred for 30 min at ambient temperature. The flask was then placed in an oil bath heated at 60° C. and the reaction mixture was stirred under a nitrogen atmosphere for 16 hours. The crude reaction mixture was purified by vacuum distillation to give a light yellow oil with the molecular formula $C_{10}H_{25}NO_3Si$ that was characterized by NMR spectroscopy. The product from this reaction was used as a starting material in the synthesis of the following polyoxometalate derivative: To a solution of acetonitrile (40 mL) and distilled water (12 mL) was added $K_8[SiW_{11}O_{39}] \cdot 13\ H_2O$ (5.00 g, 1.55 mmol) under vigorous stirring. This mixture was stirred for 5 minutes and then 4-aminobutyltriethoxysilane (0.73 g, 3.1 mmol) was added. The reaction mixture was stirred another 5 minutes and to this was added concentrated HCl (0.77 mL, 9.3 mmol) dropwise via a syringe. The flask was capped and stirred at ambient temperature for 16 hours. A small amount of white precipitate was removed by filtration giving a clear, colorless solution. The solvent was then removed by rotary evaporation and then under high vacuum. A light yellow solid resulted with the molecular formula $K_4[SiW_{11}O_{40}(SiC_4H_8NH_2)_2]$ (i.e., a polyoxometalate derivative and counter cation complex) and was characterized by MALDI-TOF and NMR spectroscopy.

The butylsilane hybrid of tungstosilicate $(K_4[SiW_{11}O_{40}(SiC_4H_9)_2])$ was synthesized according to the following procedure: To a solution of acetonitrile (40 mL) and distilled water (12 mL) was added $K_8[SiW_{11}O_{39}] \cdot 13\ H_2O$ (5.00 g, 1.55 mmol) under vigorous stirring. This mixture was stirred for 10 minutes and then butyltrimethoxysilane (0.6 mL, 3.1 mmol) was added. The reaction mixture was stirred another 10 minutes and to this was added concentrated HCl (0.77 mL, 9.3 mmol) drop wise via syringe. The flask was capped and stirred at ambient temperature for 16 hours. A small amount of white precipitate was removed by filtration giving a clear, colorless solution. The solvent was then removed by rotary evaporation and then under high vacuum. A white solid resulted with the molecular formula $K_4[SiW_{11}O_{40}(SiC_4H_9)_2]$ and was characterized by IR, MALDI-TOF, and NMR spectroscopy. The product from this reaction was used as a starting material in the synthesis of the following polyoxometalate derivative: The butyl substituted 11-tungstosilicate (1.01 g, 0.33 mmol) was loaded into a vial and dissolved in 4 mL of $H_2O$. The 1-methylguanidine hydrochloride (150 mg, 1.34 mmol) was dissolved in 1 mL of $H_2O$ and this solution was added drop wise to the POM derivative. A precipitate immediately formed. The reaction mixture was stirred for 20 min and then it was placed in the refrigerator for 30 minutes. The resulting solid was collected by vacuum filtration and dried in a vacuum oven at 50° C. for 72 hours. A white solid resulted with the molecular formula $(C_2H_8N_3)_3[SiW_{11}O_{40}(SiC_4H_9)_2]$ (i.e., a polyoxometalate derivative and counter cation complex) and this was characterized by NMR spectroscopy.

Solid samples of the polyoxometalate derivative and counter cation complexes were irradiated at 365 nm with a 15 W bulb for 30 minutes and a color change, if any, was recorded. A summary of these qualitative results is given in Table 1.

TABLE 1

| Compound | Formula or schematic of structure | Color of solid | Observed photochromism |
|---|---|---|---|
| potassium 11-tungstosilicate | $K_8[SiW_{11}O_{39}]$ | white | No |
| tris(tetrabutylammonium) guanidine substituted 11-tungstophosphate | (schematic structure) | white | Yes |

TABLE 1-continued

| Compound | Formula or schematic of structure | Color of solid | Observed photochromism |
| --- | --- | --- | --- |
| tris(tetrabutylammonium) propylamine substituted 11-tungstophosphate | (Bu$_4$N)$_3$ [structure with two H$_2$N-propyl-Si groups on tungstophosphate cage] | white | Yes |
| propylguanidine substituted 11-tungstosilicate | K$_4$ [structure with two HCl·propylguanidine-Si groups on tungstosilicate cage] | off-white | Yes |
| 4-aminobutylsilane hybrid of 11-tungstosilicate | K$_4$ [structure with two H$_2$N-butyl-Si groups on tungstosilicate cage] | light yellow | Yes |
| tetra(methylguanidinium) butyl substituted 11-tungstosilicate | (MeGua)$_4$ [structure with two n-Bu-Si groups on tungstosilicate cage] | white | Yes |

TABLE 1-continued

| Compound | Formula or schematic of structure | Color of solid | Observed photochromism |
|---|---|---|---|
| 3-aminopropylsilane hybrid of 11-tungstosilicate | 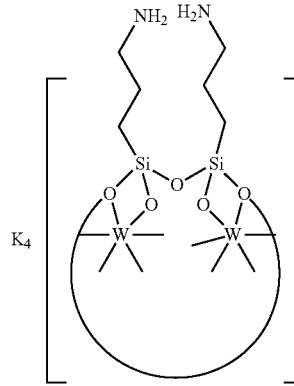 | white | Yes |
| N-(2-aminoethyl)-3-aminopropylsilane hybrid of 11-tungstosilicate | 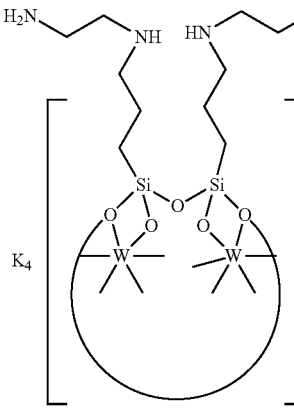 | white | Yes |

Example 2 (EX-2)

Polymethylmethacrylate (PMMA, 1.0 g) was dissolved in acetonitrile (5 mL) in a 20 mL screw-top vial with magnetic stirring at a slightly elevated temperature. To the vial was added 0.1 g of the 3-aminopropylsilane hybrid of tungstosilicate ($K_4[SiW_{11}O_{40}(SiC_3H_6NH_2)_2]$) such that the polyoxometalate derivative and counter cation complex was in 10 wt. % concentration relative to the PMMA. The solution was stirred to give a homogenous mixture and then was cast into 2.5 cm glass rings on a PTFE film. This was allowed to dry at room temperature overnight and was further dried in a vacuum oven at 60° C. for several hours. Using this technique to solvent cast films from PMMA gave films with many bubbles and holes caused by evaporation of the solvent. However, some qualitative data could be gathered by irradiation of the films and observing the resulting photochromic properties. The film was observed to change colors after 5-10 minutes of irradiation with a 15 W mercury lamp at 365 nm. The film was blue after irradiation and bleaching was observed after >30 minutes in the air at room temperature.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A photochromic article comprising:
   a polymer; and
   a polyoxometalate derivative and counter cation complex comprising a polyoxometalate derivative anion and a counter cation distributed in the polymer;
   wherein the polyoxometalate derivative anion is of the general formula (I):

$$[XM_{11}O_{39}(X'L_y)]^{z-} \qquad (I)$$

wherein:
   X is a heteroatom selected from the group consisting of Si, B, P, Ge, and As;
   z is from 3 to 6;
   M is W, Ta, Nb, or Mo;
   X' is a heteroatom or group containing a heteroatom, selected from the group consisting of Si—O—Si, P, Ge, Ti, Sn, and As;
   y is from 1 to 2, wherein when X' is Si—O—Si, y is 2 and one L is bound to each Si atom;
   L is of formula (II), an alkylguanidine group, an alicyclic group, an aliphatic group, or an aryl group;

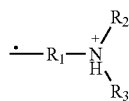
(II)

wherein:
R₁ is an alkylene group and R₂ and R₃ are independently selected from the group consisting of H, an alkyl group, an alkenyl group, an alkylamine group, an amide group, an imine group, a heterocyclic group, an aryl group, and an alicyclic group; and the counter cation is selected from the group consisting of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, a monatomic cation, and combinations thereof; with the proviso that when the counter cation is a monatomic cation L is an alkylamine group or an alkylguanidine group;

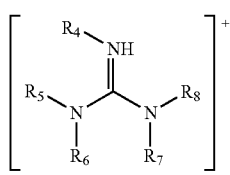
(III)

wherein:
R₄ through R₈ are independently selected from the group consisting of H, an alkyl group, an alicyclic group, an alkenyl group, and an aryl group, with the proviso that fewer than all of R₄ through R₈ are H; or R₄ through R₆ are independently selected from the group consisting of H, an alkyl group, an alicyclic group, an alkenyl group, and an aryl group, and R₇ and R₈ taken together with the N to which they are both bonded form a heterocyclic ring;

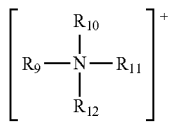
(IV)

wherein:
R₉ is H, an alkyl group, an alkylamine group, or an alicyclic group; R₁₀ is an alkyl group or an alkylamine group; R₁₁ and R₁₂ are independently selected from the group consisting of H and an alkyl group; and

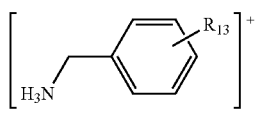
(V)

wherein R₁₃ is C≡N, an alkoxy group, an alkyl group, an alkenyl group, or an aryl group;

with the proviso that if L is an alicyclic group, an aliphatic group, or an aryl group then the counter cation contains a protonated amine group, wherein L is bonded to X' through a carbon atom;
wherein the counter cation is not covalently bonded to the polymer, and wherein the article is photochromic.

2. The photochromic article of claim 1, wherein the polymer does not participate stoichiometrically in a photochromic redox reaction of the polyoxometalate derivative and counter cation complex.

3. The photochromic article of claim 1, wherein the polymer comprises polymethylmethacrylate (PMMA), poly(butyl acrylate), poly(tetrahydrofurfural acrylate), poly(isooctyl acrylate), poly(isobornyl acrylate), poly(hydroxyethyl acrylate), polymethylmethacrylate copolymer, or a combination thereof.

4. The photochromic article of claim 1, wherein L is propylguanidine hydrochloride, the cation is tetrabutylammonium, z is 3, X' is Si—O—Si, and X is P.

5. The photochromic article of claim 1, wherein the polyoxometalate-guanidinium salt complex is homogeneously distributed in the polymer.

6. A method of forming a photochromic film comprising:
forming a composition comprising a polymer or a precursor of the polymer and a polyoxometalate derivative and counter cation complex comprising a polyoxometalate derivative anion and a counter cation distributed in the polymer; and
preparing a film from the composition, the film comprising the polyoxometalate derivative and counter cation complex distributed in the polymer wherein the counter cation is not covalently bonded to the polymer;
wherein the polyoxometalate derivative anion is of formula (I):

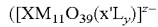
(I)

wherein:
X is a heteroatom selected from the group consisting of Si, B, P, Ge, and As;
z is from 3 to 6;
M is W, Ta, Nb, or Mo;
X' is a heteroatom or group containing a heteroatom, selected from the group consisting of Si—O—Si, P, Ge, Ti, Sn, and As;
y is from 1 to 2, wherein when X' is Si—O—Si, y is 2 and one L is bound to each Si atom;
L is of formula (II), an alkylamine group, an alkylguanidine group, an alicyclic group, an aliphatic group, or an aryl group;

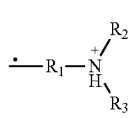
(II)

wherein:
R₁ is an alkylene group and R₂ and R₃ are independently selected from the group consisting of H, an alkyl group, an alkenyl group, an alkylamine group, an amide group, an imine group, a heterocyclic group, an aryl group, and an alicyclic group; and
the counter cation is selected from the group consisting of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, a monatomic cation, and combinations thereof; with the proviso that when the counter cation is a monatomic cation L is an alkylamine group or an alkylguanidine group;

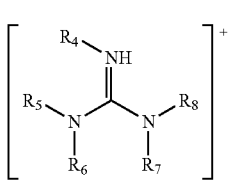

wherein:
$R_4$ through $R_8$ are independently selected from the group consisting of H, an alkyl group, an alicyclic group, an alkenyl group, and an aryl group, with the proviso that fewer than all of $R_4$ through $R_8$ are H; or $R_4$ through $R_6$ are independently selected from the group consisting of H, an alkyl group, an alicyclic group, an alkenyl group, and an aryl group, and $R_7$ and $R_8$ taken together with the N to which they are both bonded form a heterocyclic ring;

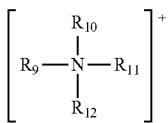

wherein:
$R_9$ is H, an alkyl group, an alkylamine group, or an alicyclic group; $R_{10}$ is an alkyl group or an alkylamine group; $R_{11}$ and $R_{12}$ are independently selected from the group consisting of H and an alkyl group; and

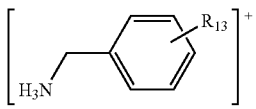

wherein $R_{13}$ is C≡N, an alkoxy group, an alkyl group, an alkenyl group, or an aryl group;
with the proviso that if L is an alicyclic group, an aliphatic group, or an aryl group then the counter cation contains a protonated amine group, wherein L is bonded to X' through a carbon atom;
wherein the film is photochromic.

7. The method of claim 6, wherein the polyoxometalate derivative and counter cation complex is dissolved in the composition.

8. The method of claim 6, wherein the polyoxometalate derivative and counter cation complex is dispersed in the composition.

9. The method of claim 6, wherein preparing the film comprises drying the composition in an atmosphere comprising less than 50% relative humidity.

10. A precursor composition for forming a photochromic article, the precursor composition comprising:

a polymer or a precursor of the polymer; and
a polyoxometalate derivative and counter cation complex comprising a polyoxometalate derivative anion and a counter cation dissolved in the composition or dispersed in the composition, wherein the counter cation is not covalently bonded to the polymer;
wherein the polyoxometalate derivative anion is of formula (I):

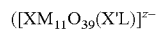

wherein:
X is a heteroatom selected from the group consisting of Si, B, P, Ge, and As;
z is from 3 to 6;
M is W, Ta, Nb, or Mo;
X' is a heteroatom or group containing a heteroatom, selected from the group consisting of Si—O—Si, P, Ge, Ti, Sn, and As;
y is from 1 to 2, wherein when X' is Si—O—Si, y is 2 and one L is bound to each Si atom;
L is of formula (II), an alkylamine group, an alkylguanidine group, an alicyclic group, an aliphatic group, or an aryl group;

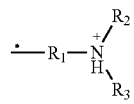

wherein:
$R_1$ is an alkylene group and $R_2$ and $R_3$ are independently selected from the group consisting of H, an alkyl group, an alkenyl group, an alkylamine group, an amide group, an imine group, a heterocyclic group, an aryl group, and an alicyclic group; and
the counter cation is selected from the group consisting of formula (III), of formula (IV), of formula (V), a phenylalanine cation, an alanine cation, an arginine cation, a glycine cation, a histidine cation, a proline cation, an aniline cation, a N,N-dimethylaminopyridine cation, a morpholine cation, a piperazine cation, a monatomic cation, and combinations thereof; with the proviso that when the counter cation is a monatomic cation L is an alkylamine group or an alkylguanidine group;

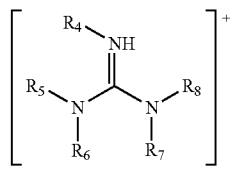

wherein:
$R_4$ through $R_8$ are independently selected from the group consisting of H, an alkyl group, an alicyclic group, an alkenyl group, and an aryl group, with the proviso that fewer than all of $R_4$ through $R_8$ are H; or $R_4$ through $R_6$ are independently selected from the group consisting of H, an alkyl group, an alicyclic group, an alkenyl group, and an aryl group, and $R_7$ and $R_8$ taken together with the N to which they are both bonded form a heterocyclic ring;

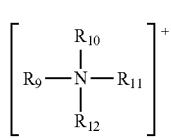
(IV)

wherein:
R$_9$ is H, an alkyl group, an alkylamine group, or an alicyclic group; R$_{10}$ is an alkyl group or an alkylamine group; R$_{11}$ and R$_{12}$ are independently selected from the group consisting of H and an alkyl group; and

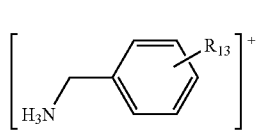
(V)

wherein R$_{13}$ is C≡N, an alkoxy group, an alkyl group, an alkenyl group, or an aryl group; and
with the proviso that if L is an alicyclic group, an aliphatic group, or an aryl group then the counter cation contains a protonated amine group, wherein L is bonded to X' through a carbon atom.

11. The precursor composition of claim 10, further comprising a solvent and the polymer or precursor of the polymer is dissolved in the solvent.

* * * * *

UNITED STATES PATENT AND TRADEMARK OFFICE
CERTIFICATE OF CORRECTION

PATENT NO. : 9,976,077 B2
APPLICATION NO. : 15/320495
DATED : May 22, 2018
INVENTOR(S) : Miller Page 1 of 2

It is certified that error appears in the above-identified patent and that said Letters Patent is hereby corrected as shown below:

On the Title Page

Column 1,
Line 3, after "0 days." delete "days.".

In the Specification

Column 5,
Line 5, delete "poloxometalate" and insert -- polyoxometalate --, therefor.

Column 8,

Lines 7-10, delete " 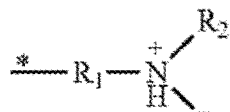 " and insert -- 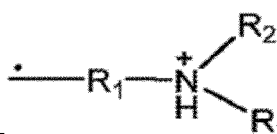--, therefor.

Column 13,

Lines 15-17, delete " 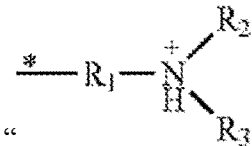 " and insert -- 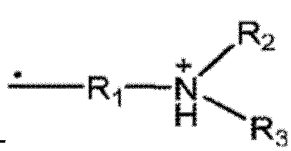 --, therefor.

Column 15,
Line 67, delete "$([XM_{11}O_{39}(X'L_y)]^{z-}$" and insert -- $[XM_{11}O_{39}(X'L_y)]^{z-}$ --, therefor.

Signed and Sealed this
Twenty-fourth Day of July, 2018

Andrei Iancu
*Director of the United States Patent and Trademark Office*

Column 16,

Lines 15-19, delete " 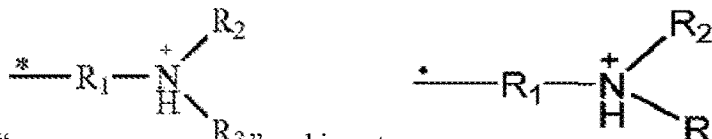 " and insert -- , therefor.

Column 19,
Line 23, delete "$([XM_{11}O_{39}(X'L)]^{z-}$" and insert -- $[XM_{11}O_{39}(X'L)]^{z-}$ --, therefor.

Lines 35-40, delete " 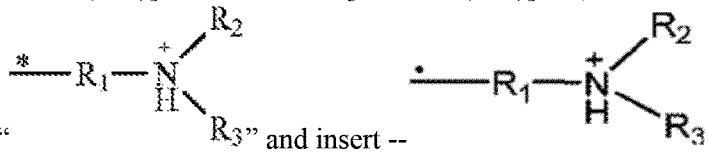 " and insert -- , therefor.

Columns 21 & 22,
Line 11, delete "Compnay," and insert -- Company, --, therefor.
Line 18, delete "poly(metylmethacrylate-" and insert -- poly(methylmethacrylate- --, therefor.

Column 23,
Line 49, delete "$W_{12}SiO_{40}^{4-}$," and insert -- $W_{12}SiO_{40}^{4-}$, --, therefor.

Column 24,
Line 4, delete "$K_8[SiW_{11}O_{39}].13H_2O$" and insert -- $K_8[SiW_{11}O_{39}].13\ H_2O$ --, therefor.

In the Claims

Column 32,
Line 37, in Claim 6, delete "$([XM_{11}O_{39}(x'L_y)]^{z-}$" and insert -- $[XM_{11}O_{39}(X'L_y)]^{z-}$ --, therefor.

Column 34,
Line 10, in Claim 10, delete "$([XM_{11}O_{39}(X'L)]^{z-}$" and insert -- $[XM_{11}O_{39}(X'L_y)]^{z-}$ --, therefor.